S. D. HUFF.
AUTOMATIC STOCK AND POULTRY FEEDER.
APPLICATION FILED JUNE 20, 1911.

1,020,505.

Patented Mar. 19, 1912.

2 SHEETS—SHEET 1.

Witnesses

Inventor
Samuel D. Huff.

By
Attorneys.

S. D. HUFF.
AUTOMATIC STOCK AND POULTRY FEEDER.
APPLICATION FILED JUNE 20, 1911.
1,020,505.
Patented Mar. 19, 1912.
2 SHEETS—SHEET 2.
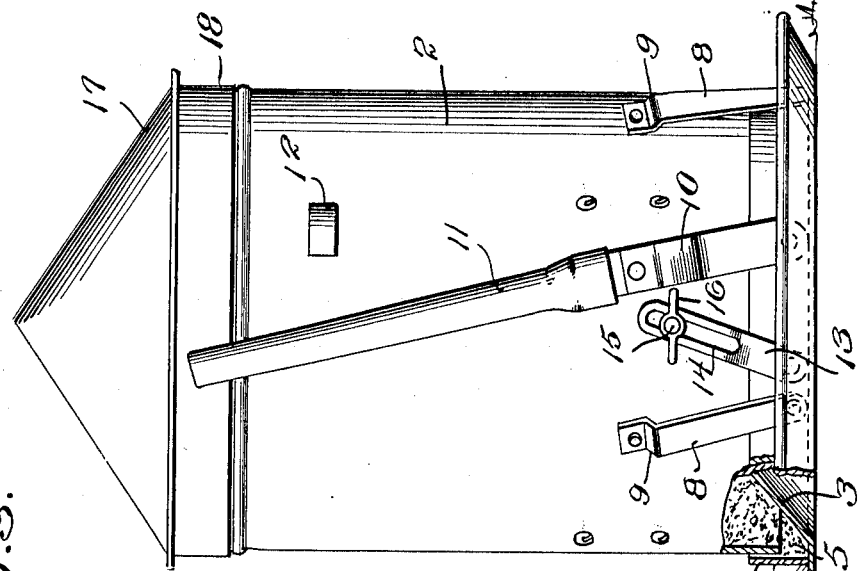
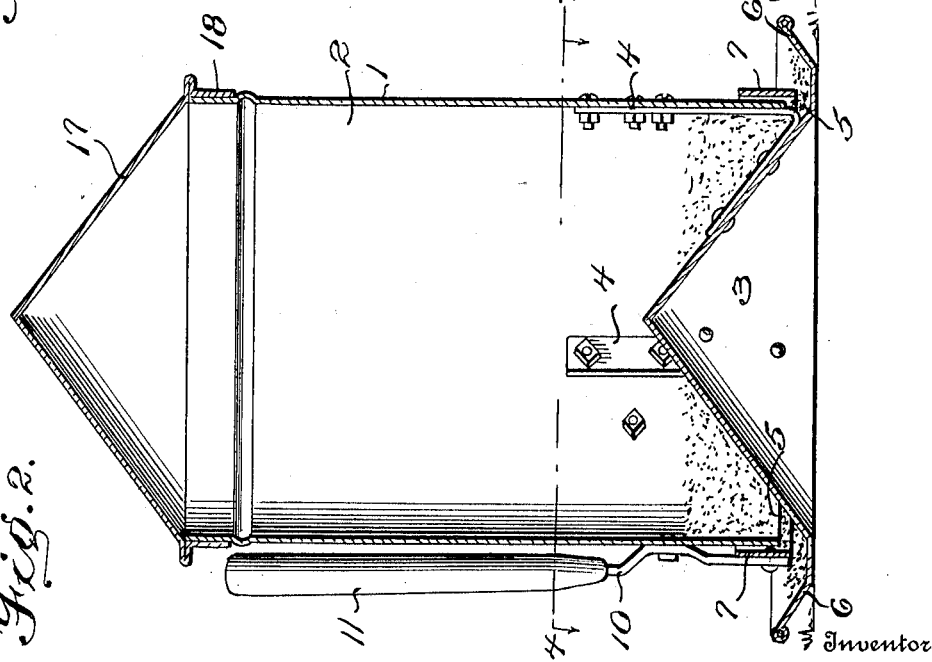
Witnesses
Inventor
Samuel D. Huff.
By
Attorneys.

UNITED STATES PATENT OFFICE.

SAMUEL D. HUFF, OF WICHITA, KANSAS.

AUTOMATIC STOCK AND POULTRY FEEDER.

1,020,505.  Specification of Letters Patent.  Patented Mar. 19, 1912.

Application filed June 20, 1911. Serial No. 634,379.

*To all whom it may concern:*

Be it known that I, SAMUEL D. HUFF, citizen of the United States, residing at Wichita, in the county of Sedgwick and State of Kansas, have invented certain new and useful Improvements in Automatic Stock and Poultry Feeders, of which the following is a specification.

The present invention relates to the art of animal husbandry, and the object of the invention is to provide an improved stock and poultry feeder including a receptacle that is adapted to contain a supply of material and that is surrounded at its lower end by a trough into which the material is fed automatically.

Another object of the invention is to provide improved means for controlling the escape of material from the receptacle so as to regulate the quantity of material passing into the trough and permit the material to be entirely cut off therefrom when occasion requires.

A further object of the invention is to provide a device of this character which is thoroughly reliable and efficient in use, which is simple, durable and strong in construction, and which is capable of being easily and cheaply manufactured.

With these and other objects in view as will more fully appear as the description proceeds, the invention consists of certain constructions, arrangements and combinations of the parts that I shall hereinafter fully describe and claim.

Figure 1:
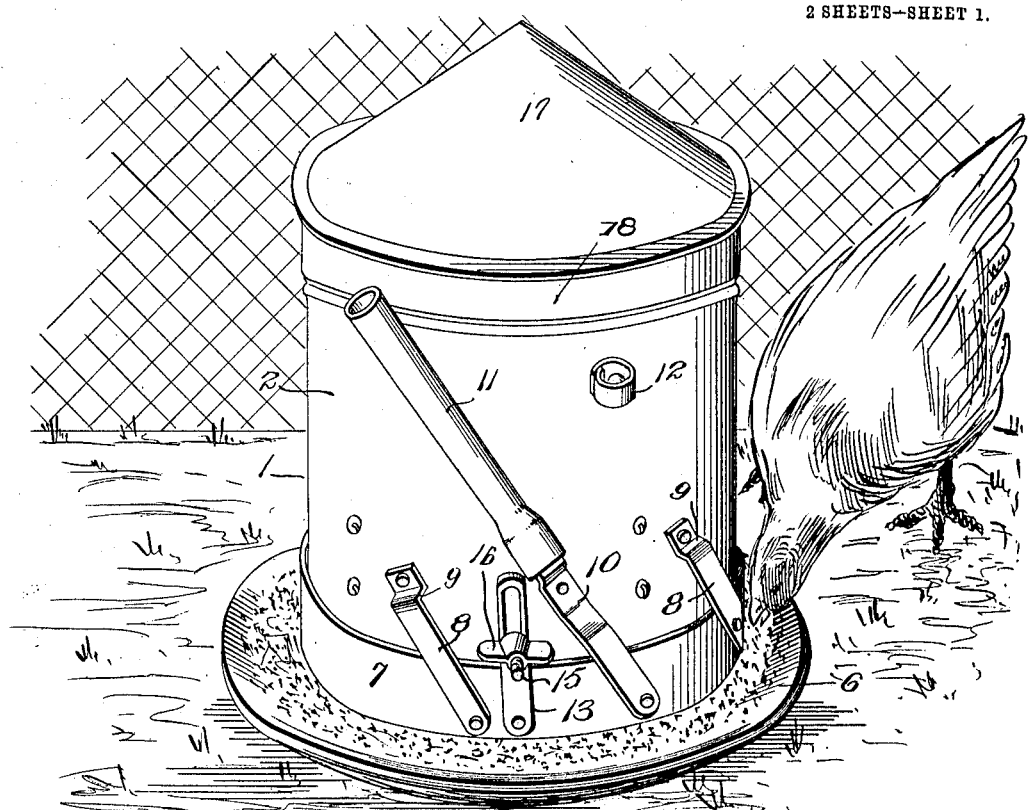
Figure 4:
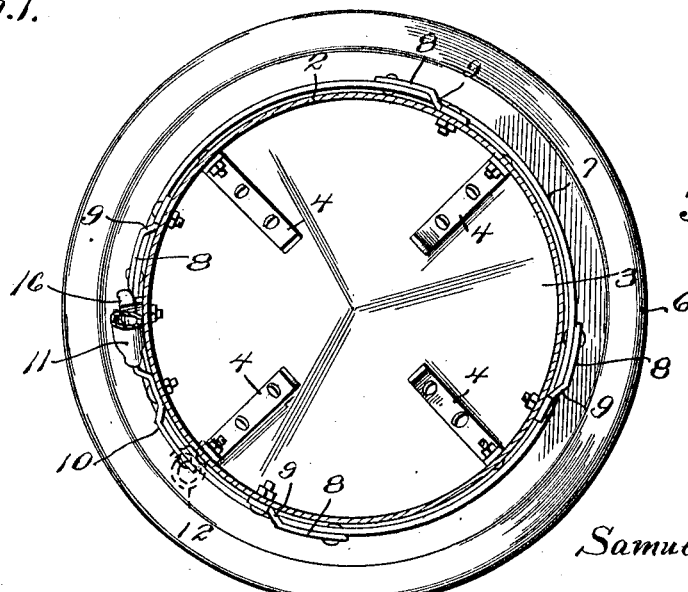

For a full understanding of the invention, reference is to be had to the following description and accompanying drawings in which:

Figure 1 is a perspective view of my improved feeding device; Fig. 2 is a vertical section thereof; Fig. 3 is a side elevation partly broken away; and Fig. 4 is a horizontal section on the line 4—4 of Fig. 2.

Corresponding and like parts are referred to in the following description and indicated in all the views of the accompanying drawings by the same reference characters.

My improved feeding device is preferably constructed of suitable sheet metal in order to be durable and light in construction and to be capable of withstanding exposure to the weather.

The device includes a receptacle which is designated as a whole by the reference numeral 1, and which is designed to contain a supply of grain or other material to be fed to the poultry or stock. The receptacle comprises a cylindrical body portion 2 that is disposed substantially vertically and constitutes the side walls of the receptacle. The body portion is connected to the bottom 3 of the receptacle by means of a plurality of angle brackets 4, one arm of each bracket being attached to the bottom and the other arm to the inner surface of the body portion. The brackets support the lower end of the body portion in slightly spaced relation to the bottom in order to provide an annular outlet opening 5 which permits the material to escape into a trough 6. The trough is also of annular contour and is constructed by extending the bottom 3 outwardly beyond the periphery of the body portion, the outer portion of the trough being upturned, as shown, to confine the material and prevent it from being scattered over the ground. Attention is particularly directed to the fact that the bottom 3 of the receptacle is cone-shaped and inclines downwardly from its central point toward the annular outlet opening 5 whereby to serve as a deflector for directing the material through the outlet opening and automatically feeding the material into the trough.

In order to regulate the escape of material from the receptacle I provide a cut-off device which is in the form of a ring 7 that fits snugly around the lower end of the body portion 2 and is movable both vertically and circumferentially thereon. The ring is connected at intervals to the body portion of the receptacle through the medium of a series of suspension links 8, each link being pivoted at its upper end to the body portion and at its lower end to the ring. The links are offset at corresponding intermediate points, as indicated at 9, in order to permit their lower ends to overlap the outer surface of the ring without the liability of the links binding on their pivots. A lever 10 of the first class is mounted on one side of the receptacle and is fulcrumed thereon at a point above the ring, the lower arm of the lever being substantially similar to the links and being pivoted terminally to the ring. The upper arm of the lever is slightly offset away from the periphery of the body portion and has a tubular operating handle 11 fitted thereon. By moving the handle the lever is rocked and thereby turns the ring on the body portion so as to swing the links laterally in the same circular direction to move the ring vertically across the outlet opening 5. The movement of the lever in one direction raises the ring to permit the material to escape into the trough, while the movement of the lever in the opposite direction forces the ring against the bottom 3 to entirely close the outlet opening. It is to be noted that the links 8 and the lower arm of the lever 10 are of the same length and are inclined at the same angle in any given position of the parts. By virtue of this arrangement the ring is raised or lowered equally at all points and is thus prevented from binding on the periphery of the body portion 2. Furthermore the lower edge of the ring is spaced apart at all points an equal distance from the bottom of the receptacle to maintain a substantially uniform feed of material on all sides of the receptacle. The links 8 are of sufficient length to be prevented from assuming vertical positions when the ring is closed, and hence the ring may be held against the bottom with considerable force, without the liability of moving the links past their centers. A finger loop 12 is preferably pivoted to the side of the receptacle in proximity to the handle 11 in order to enable this handle to be manipulated with greater convenience. It is, of course, essential to provide means for retaining the ring in any desired adjusted position in which it may be placed by the lever. To this end I employ an arm 13 which is pivoted at its lower end to the ring, the upper end of the arm projecting upwardly beyond the ring and being formed with a slot 14 in which operates a threaded stud 15 outstanding from the periphery of the body portion 2. A winged nut 16 works on the outer extremity of the stud and is designed to be clamped against the arm to lock the ring and its associated parts against movement.

The device is completed by a cover 17 which closes the upper end of the receptacle 1 and excludes dirt and other foreign matter from the material contained therein. A flange 18 depends from the circumference of the cover and fits snugly around the periphery of the body portion to retain the cover frictionally in place. The cover is dome-shape, preferably of conical contour, in order to add to the ornamental appearance of the device as a whole and to prevent rubbish from accumulating on the top of the receptacle.

From the foregoing description in connection with the accompanying drawings it is believed that the use of my improved feeding device will be obvious. The ring 7 is raised and secured in raised position by the winged nut 16, in order to permit the material contained in the receptacle to escape through the outlet opening 5 into the trough. As the poultry, stock, or other animals to be fed consume the material in the trough, more material escapes through the outlet opening to keep the trough filled automatically. It is quite advantageous to have an annular trough entirely surrounding the receptacle, since a large number of animals may be fed at one time without the liability of crowding or otherwise interfering with each other. The flow of material into the trough is regulated by securing the ring in different vertically adjusted positions. When the animals have finished feeding, the ring is moved downwardly to entirely close the outlet opening, thereby cutting off the supply of material to the trough and insuring against possible waste. By removing the cover 17 the receptacle may be conveniently refilled from time to time when occasion requires.

For the sake of perspicuity the parts 3 and 6 have heretofore been referred to as the bottom of the receptacle, and the trough, respectively, but it will be apparent that when taken together, these parts form, in effect, a pan over which the hollow body portion is supported. Hence, it is to be understood that both parts are embraced in the single term "pan," and that any suitable form of pan may be employed, although the form of pan shown in the drawings is, of course, preferable.

Having thus described the invention, what I claim as new is:

A feeder comprising a cylindrical receptacle mounted upon a bottom and spaced at its lower edge therefrom, a ring surrounding the receptacle, links pivoted at their upper ends to the receptacle and at their lower ends to the ring, a slotted link pivoted at its lower end to the ring, a stud carried by the receptacle and passing through the slot in the last mentioned link, and a nut threaded upon said stud.

In testimony whereof, I affix my signature in presence of two witnesses.

SAMUEL D. HUFF. [L. S.]

Witnesses:
 JESSE A. RODGERS,
 C. C. MERRY.

---

Copies of this patent may be obtained for five cents each, by addressing the "Commissioner of Patents, Washington, D. C."